(12) United States Patent
Tennant

(10) Patent No.: US 7,394,843 B2
(45) Date of Patent: Jul. 1, 2008

(54) SPREAD SPECTRUM VERIFICATION CIRCUIT

(75) Inventor: Timothy R. Tennant, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/949,110

(22) Filed: Dec. 3, 2007

(65) Prior Publication Data

US 2008/0084918 A1   Apr. 10, 2008

Related U.S. Application Data

(63) Continuation of application No. 10/870,376, filed on Jun. 17, 2004, now Pat. No. 7,356,067.

(51) Int. Cl.
*H04B 1/69* (2006.01)

(52) U.S. Cl. .................. 375/130; 375/228; 375/377

(58) Field of Classification Search ................. 375/130, 375/228, 377, 140, 286, 287, 229, 230, 231
See application file for complete search history.

(56) References Cited

OTHER PUBLICATIONS http://www.geocities.com/IECMaster/circuits_msr/clr_mrs011.html,Frequencycomparator, last updated Feb. 15, 2002.

*Primary Examiner*—Temesghen Ghebretinsae
(74) *Attorney, Agent, or Firm*—Joan Pennington

(57) ABSTRACT

A method for verifying a spread spectrum function and a spread spectrum verification circuit are provided. Comparing an output frequency of the spread spectrum function with a reference frequency for the spread spectrum function tests an upper bound of the spread spectrum function. If the output frequency increases above the reference frequency, the upper bound of the spread spectrum function is verified. Comparing the reference frequency for the spread spectrum function with the output frequency of the spread spectrum function tests a lower bound of the spread spectrum function. If the output frequency decreases below the reference frequency, the lower bound of the spread spectrum function is verified.

8 Claims, 2 Drawing Sheets

SPREAD SPECTRUM VERIFICATION CIRCUIT

This application is a continuation application of Ser. No. 10/870,376 filed on Jun. 17, 2004 now U.S. Pat. No. 7,356,067.

FIELD OF THE INVENTION

The present invention relates generally to the test equipment and test circuits, and more particularly, relates to a method for verifying a spread spectrum function and a spread spectrum verification circuit.

DESCRIPTION OF THE RELATED ART

Spread spectrum circuits provide a relatively new technology that helps circuit card designers reduce the amount of electromagnetic interference (EMI) of circuit card designs generally without requiring any re-designs.

Frequency references, such as crystal oscillators, voltage controlled oscillators (VCOs), and integrated circuit based phase-locked loops (PLLs), are a major source of EMI on circuit boards. A spread spectrum circuit involves modulating a reference frequency and is able to substantially reduce the amount of EMI created by the frequency reference.

Spread spectrum circuits create a problem for card testing because there is no easy way to verify that the spread spectrum function is actually working. A very expensive frequency analyzer has been used as the only way to verify that a spread spectrum circuit was working as designed.

A need exists for an effective mechanism to verify a spread spectrum function.

SUMMARY OF THE INVENTION

Principal aspects of the present invention are to provide a method for verifying a spread spectrum function and a spread spectrum verification circuit. Other important aspects of the present invention are to provide such method and spread spectrum verification circuit substantially without negative effect and that overcome many of the disadvantages of prior art arrangements.

In brief, a method for verifying a spread spectrum function and a spread spectrum verification circuit are provided. Comparing an output frequency of the spread spectrum function with a reference frequency for the spread spectrum function tests an upper bound of the spread spectrum function. If the output frequency increases above the reference frequency, the upper bound of the spread spectrum function is verified. Comparing the reference frequency for the spread spectrum function with the output frequency of the spread spectrum function tests a lower bound of the spread spectrum function. If the output frequency decreases below the reference frequency, the lower bound of the spread spectrum function is verified.

The spread spectrum verification circuit includes a first frequency comparator for comparing an output frequency of the spread spectrum function with a reference frequency for the spread spectrum function tests an upper bound of the spread spectrum function. A second frequency comparator is provided for comparing the reference frequency for the spread spectrum function with the output frequency of the spread spectrum function tests a lower bound of the spread spectrum function. The outputs of the first frequency comparator and the second frequency comparator are combined to generate a fail signal responsive to a failure of either or both the upper bound and the lower bound.

In accordance with features of the invention, for a center spread spectrum function the input frequency to the spread spectrum function is used as the reference frequency. For a down spread spectrum function a predefined center operating frequency of the spread spectrum function is used as the reference frequency.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a method is provided for verifying a spread spectrum function that is implemented by a spread spectrum verification circuit of the preferred embodiment. Spread spectrum verification circuit of the preferred embodiment tests an upper bound and a lower bound of a spread spectrum function. Spread spectrum verification circuit determines whether an output frequency of the spread spectrum function moves above and below a reference frequency to ensure that the spread spectrum function is operating correctly. Test effectiveness and circuit card quality are improved by the low cost method of spread spectrum verification of the preferred embodiment.

Figure 1:
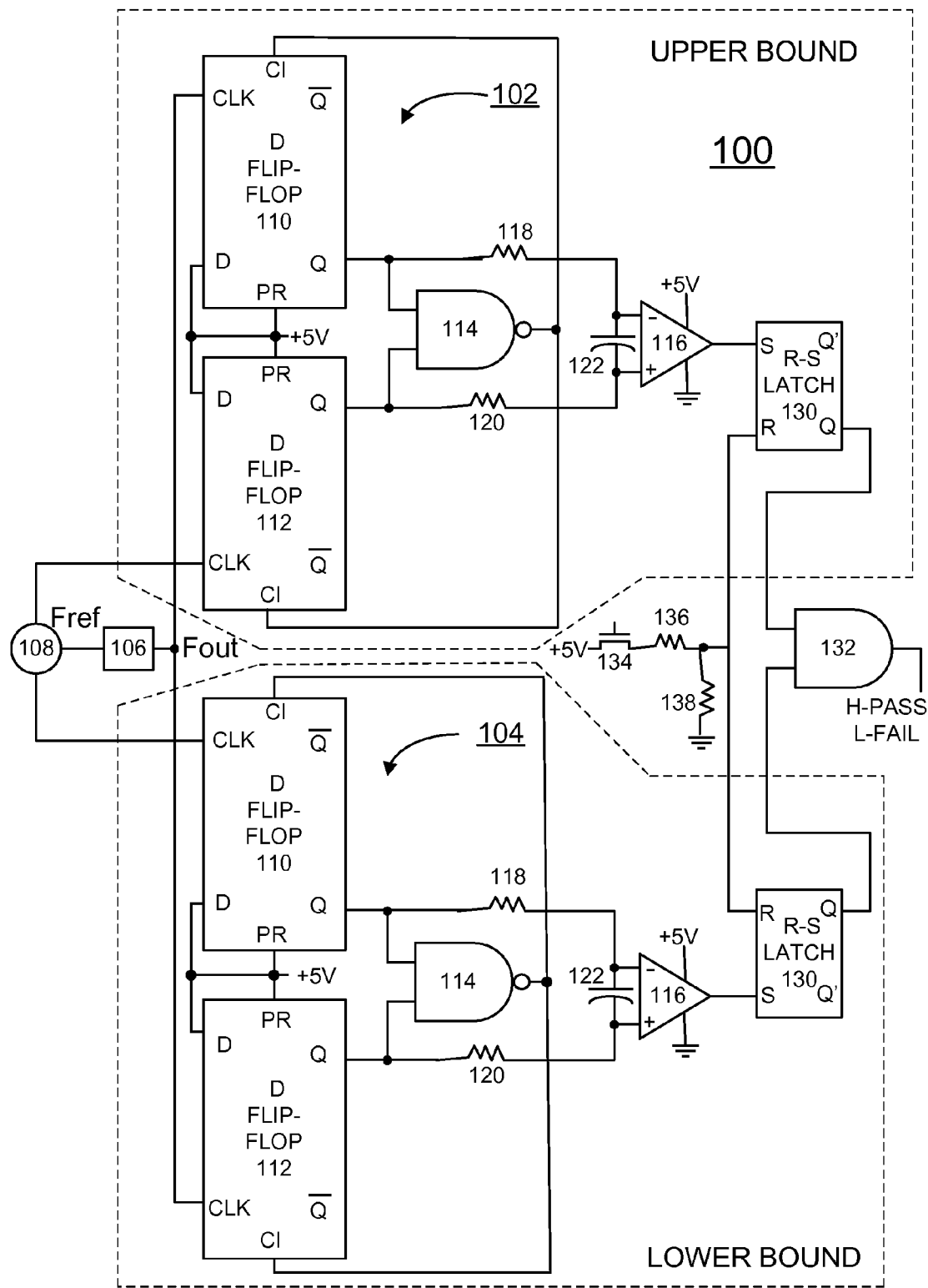
FIG. 1 is a schematic diagram illustrating an exemplary spread spectrum verification circuit in accordance with the preferred embodiment.

Having reference now to the drawings, in FIG. 1, there is shown an exemplary spread spectrum verification circuit in accordance with the preferred embodiment generally designated by the reference character 100. Spread spectrum verification circuit 100 includes a first frequency comparator generally designated by the reference character 102 and a second frequency comparator generally designated by the reference character 104. The first and second frequency comparators 102, 104 respectively test an upper bound and a lower bound of a spread spectrum function 106.

Spread spectrum function 106 has two main options: selecting between center spread or down spread, and selecting the spread range, for example, 2.5%, 5%, and the like. Center spread means that the actual output frequency will vary around the reference frequency. Down spread means the actual output frequency will vary the defined percentage below the reference frequency.

FIG. 1 illustrates a center spread spectrum verification circuit 100 that uses the input frequency to the spread spectrum module 106 as the reference frequency. For example, a 50 MHz clock setup for center spread and 5% of the spread spectrum module 106 will have a varying output frequency from 48.75 MHz to 51.25 MHz. The 5% frequency spread is centered on the input frequency that is equal to the reference frequency in the center spread spectrum verification circuit 100.

An input frequency source 108 provides the input frequency Fref applied to the spread spectrum function 106 and applied to the first and second frequency comparators 102, 104. An output frequency Fout of the spread spectrum function 106 is applied to the first and second frequency comparators 102, 104.

The first frequency comparator 102 determine if the output frequency of the center spread spectrum function 106 ever increases above the reference frequency, so this tests the upper bound. The second frequency comparator 104 determines if the output frequency of the center spread spectrum function 106 ever decreases below the reference frequency, so this tests the lower bound. The spread spectrum verification circuit 100 proves that the output of the spread spectrum function 106 is moving above and below the reference frequency when an output of spread spectrum verification circuit 100 is a high or logic one, verifying correct operation of the spread spectrum function 106.

Each of the first frequency comparator 102 and the second frequency comparator 104 includes a pair of D-type flip-flops 110, 112 having a respective clock input respectively coupled to the output of the spread spectrum function 106 and the reference frequency. A Q output of the respective flip-flops 110, 112 is coupled to a NAND gate 114. The output of NAND gate 114 is applied to a C1 input of the flip-flops 110, 112 to reset the flip-flops 110, 112, for example, with a zero output of NAND gate 114. The respective Q output of the respective flip-flops 110, 112 is coupled to a respective analog comparator 116 by a low pass filter respectively defined by a first and second resistor 118, 120 and a capacitor 122, as shown. The analog comparator 116 is, for example defined by an operational amplifier. The analog comparators 116 provide a high logic level output responsive to the output of the spread spectrum function 106 moving above and below the reference frequency. Failure of the upper bound, with the output of the spread spectrum function 106 failing to move above the reference frequency, results in a low logic level output of the upper analog comparator 116. Failure of the lower bound, with the output of the spread spectrum function 106 failing to move below the reference frequency, results in a low logic level output of the lower analog comparator 116.

An output of spread spectrum verification circuit 100 is provided with the respective output of the upper and lower bound analog comparators 116 respectively coupled to S-input of a pair of R-S latches 130. An output of the R-S latches is applied to an AND gate 132. A R-input of the pair of R-S latches 130 is connected to a reset circuit formed by an N-channel field effect transistor 134 having a clocked gate input and connected in series with a pair of resistors 136, 138 between a positive supply voltage and ground. A junction connection of the resistors 136, 138 is connected to the R-input of the pair of R-S latches 130. The output of spread spectrum verification circuit 100 provided by the AND gate 132 is a high or logic one for verifying correct operation of the spread spectrum function 106. When either or both the upper bound and the lower bound fails, the output of spread spectrum verification circuit 100 provided by the AND gate 132 is a low or logic zero for failed operation of the spread spectrum function 106.

Figure 2:
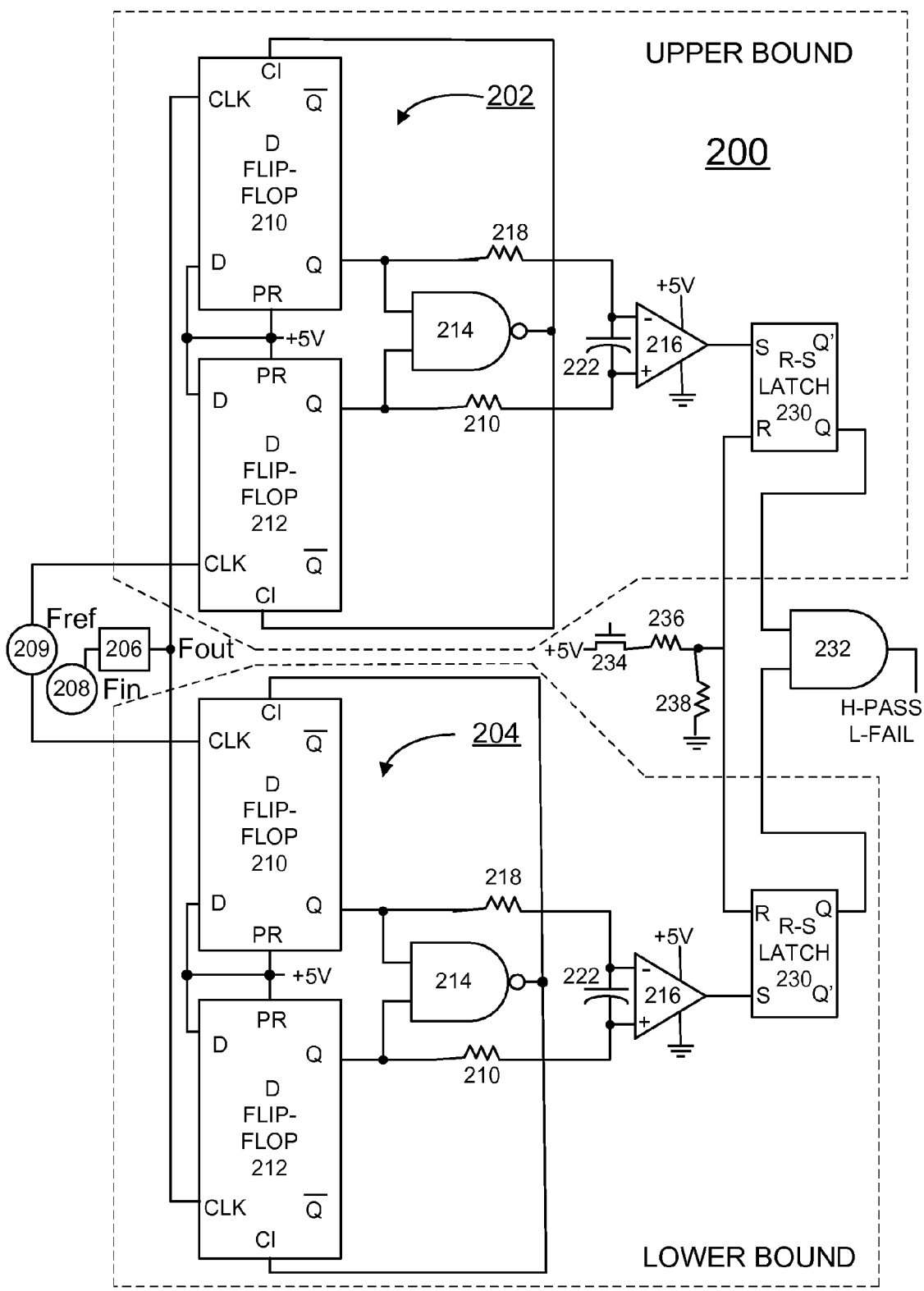
FIG. 2 is a schematic diagram illustrating a second exemplary spread spectrum verification circuit in accordance with the preferred embodiment.

FIG. 2 illustrates a down spread spectrum verification circuit 200 that uses a predefined center output frequency of the spread spectrum module 206 as the reference frequency. For example, a 100 MHz clock setup for down spread and 2.5% of the spread spectrum module 206 will have a varying output frequency from 97.5 MHz to 100 MHz.

The down spread spectrum verification circuit 200 generally uses the same methodology as the center spread spectrum verification circuit 100 except that the reference frequency must be calculated and then provided as an input to first and second frequency comparators 202, 204 because the input frequency to the spread spectrum function 206 can not be used as the center point for down spread.

An input frequency source 208 provides the input frequency Fin applied to the spread spectrum function 206 and another input frequency source 209 provides the input frequency Fref applied to the first and second frequency comparators 202, 204. An output frequency Fout of the spread spectrum function 206 is applied to the first and second frequency comparators 202, 204.

Each of the first and second frequency comparators 202, 204 provide generally identical operation as the first and second frequency comparators 102, 104 of FIG. 1 and includes a pair of D-type flip-flops 210, 212 having a respective clock input respectively coupled to the output of the spread spectrum function 206 and the reference frequency. A Q output of the respective flip-flops 210, 212 is coupled to a NAND gate 214. The output of NAND gate 214 is applied to a C1 input of the flip-flops 210, 212 to reset the flip-flops 210, 212, for example, with a zero output of NAND gate 214. The respective Q output of the respective flip-flops 210, 212 is coupled to a respective analog comparator 216 by a low pass filter respectively defined by a first and second resistor 218, 220 and a capacitor 222, as shown. The analog comparator 216 is, for example defined by an operational amplifier. The analog comparators 216 provide a high logic level output responsive to the output of the spread spectrum function 206 moving above and below the reference frequency. Failure of the upper bound, with the output of the spread spectrum function 206 failing to move above the reference frequency, results in a low logic level output of the upper analog comparator 216. Failure of the lower bound, with the output of the spread spectrum function 206 failing to move below the reference frequency, results in a low logic level output of the lower analog comparator 216.

An output of spread spectrum verification circuit 200 is provided with the respective output of the upper and lower bound analog comparators 116 respectively coupled to S-input of a pair of R-S latches 230. An output of the R-S latches is applied to an AND gate 232. A R-input of the pair of R-S latches 230 is connected to a reset circuit formed by an N-channel field effect transistor 234 having a clocked gate input and connected in series with a pair of resistors 236, 238 between a positive supply voltage and ground. A junction connection of the resistors 236, 238 is connected to the R-input of the pair of R-S latches 230. The output of spread spectrum verification circuit 200 provided by the AND gate 232 is a high or logic one for verifying correct operation of the spread spectrum function 206. When either or both the upper bound and the lower bound fails, the output of spread spectrum verification circuit 200 provided by the AND gate 232 is a low or logic zero for failed operation of the spread spectrum function 206.

In accordance with features of the invention, each of the spread spectrum verification circuits 100, 200 advantageously is implemented as a single chip and incorporated into an In-Circuit Test (ICT) fixture or into a Functional Card Test (FCT) fixture. Spread spectrum verification circuits 100, 200 also advantageously are incorporated into currently available test tools.

It should be understood that the present invention is not limited to the illustrated embodiments of spread spectrum verification circuit 100, 200, for example, spread spectrum verification circuits 100, 200 can be implemented using a programmable logic device (PLD) and few other components, rather than the illustrated individual discrete devices.

While the present invention has been described with reference to the details of the embodiments of the invention shown in the drawing, these details are not intended to limit the scope of the invention as claimed in the appended claims.

What is claimed is:

1. A spread spectrum verification circuit comprising:
a spread spectrum function;
a first frequency comparator coupled to the spread spectrum function for comparing an output frequency of the spread spectrum function with a reference frequency for testing an upper bound of the spread spectrum function;
a second frequency comparator coupled to the spread spectrum function for comparing said reference frequency with the output frequency of the spread spectrum function for testing a lower bound of the spread spectrum function; and
logic for combining outputs of said first frequency comparator and said second frequency comparator and for generating a fail signal responsive to a failure of either or both the upper bound and the lower bound.

2. A spread spectrum verification circuit as recited in claim 1 wherein said logic includes a first latch coupled to said first frequency comparator and a second latch coupled to said second frequency comparator.

3. A spread spectrum verification circuit as recited in claim 2 further includes a reset input coupled to said first latch and said second latch.

4. A spread spectrum verification circuit as recited in claim 3 further includes an AND gate coupled to a respective output of said first latch and said second latch; said AND gate providing a low output fail signal.

5. A spread spectrum verification circuit as recited in claim 1 wherein said first frequency comparator and said second frequency comparator include a pair of flip-flops, one of said pair of flip-flops having a clock input coupled to said reference frequency and another of said pair of flip-flops having a clock input coupled to the output frequency of the spread spectrum function.

6. A spread spectrum verification circuit as recited in claim 5 further includes a NAND gate coupled to a respective output of each of said pair of flip-flops; and an output of said NAND gate used to reset said pair of flip-flops.

7. A spread spectrum verification circuit as recited in claim 6 further includes an analog comparator coupled to said pair of flip-flops; said analog comparator providing said frequency comparator output applied to said logic.

8. A spread spectrum verification circuit comprising:
a spread spectrum function;
a first frequency comparator coupled to the spread spectrum function for comparing an output frequency of the spread spectrum function with a reference frequency for testing an upper bound of the spread spectrum function;
a first latch coupled to said first frequency comparator;
a second frequency comparator coupled to the spread spectrum function for comparing said reference frequency with the output frequency of the spread spectrum function for testing a lower bound of the spread spectrum function;
a second latch coupled to said second frequency comparator;
an AND gate coupled to a respective output of said first latch and said second latch for generating a low output fail signal and a high output pass signal.

* * * * *